United States Patent [19]
Moribayashi

[11] Patent Number: 5,520,273
[45] Date of Patent: May 28, 1996

[54] OVER-RUNNING CLUTCH

[75] Inventor: Satoshi Moribayashi, Himeji, Japan

[73] Assignee: Mitsubishi Denki Kabushiki Kaisha, Tokyo, Japan

[21] Appl. No.: 388,489

[22] Filed: Feb. 14, 1995

[30] Foreign Application Priority Data

Sep. 29, 1994 [JP] Japan .................... 6-235283

[51] Int. Cl.$^6$ .................................... F16D 41/064
[52] U.S. Cl. .................... 192/45; 192/41 R; 188/82.84
[58] Field of Search ............... 192/45, 44, 41 R; 188/82.1, 82.84

[56] References Cited

U.S. PATENT DOCUMENTS

| 4,902,905 | 2/1990 | Morishita | 290/48 |
| 5,411,218 | 5/1995 | Uehara et al. | 192/45 X |

FOREIGN PATENT DOCUMENTS

| 60-249737 | 12/1985 | Japan | 192/45 |
| 1-170760 | 7/1989 | Japan | 192/45 |
| 4-185921 | 7/1992 | Japan . | |
| 5-149352 | 6/1993 | Japan | 192/45 |

*Primary Examiner*—Andrea L. Pitts
*Attorney, Agent, or Firm*—Sughrue, Mion, Zinn, Macpeak & Seas

[57] ABSTRACT

An over-running clutch has a tube-like clutch outer 23 formed integrally with a boss portion 21 which is helically spline-engaged with an output shaft 1. The clutch outer is slightly diverged toward its open end due to cementation quenching, and has a plurality of grooves formed circumferentially around its inner peripheral surface at an equal pitch. Each of the grooves has a wedge-like shape which gradually decreases around the circumference. A clutch inner 24 accommodated inside the clutch outer is formed such that an axial tilting of its outer peripheral surface is substantially equal to that of the inner peripheral surface of the clutch outer. Rollers are accommodated in each of the wedge-like spaces formed between the grooves and the outer peripheral surface of the clutch inner so as to be circumferentially movable.

1 Claim, 5 Drawing Sheets

OVER-RUNNING CLUTCH

BACKGROUND OF THE INVENTION

1. Field of the Invention

The present invention relates to an over-running clutch equipped for, for example, a starter of an internal combustion engine of an automobile, or the like. More particularly, the invention relates to an over-running clutch structure which is improved in torque transmission characteristics and durability.

2. Description of the Related Art

FIG. 4 is a sectional view illustrative of a conventional over-running clutch, for example, disclosed in Japanese Utility Model Laid-Open No. 59-195231. FIG. 5 is a sectional view along line V—V of FIG. 4.

Referring to FIGS. 4 and 5, a thrust spline generally denoted by 2 is constructed to be opened toward a pinion 7 and comprises a boss portion 3 which is helically spline-engaged with an output shaft 1, a cam bottom 4, and a clutch outer 5, which components are formed integrally with each other. The clutch outer 5 has five grooves 5a which are formed circumferentially around its innner peripheral surface at an equal pitch, each having a wedge-like shape so that each gradually decreases around the circumference in a single direction and having an uniform internal diameter along the axis.

A clutch inner 6 is formed into a cylindrical shape having a uniform external diameter along the axis and is formed integrally with a pinion 7 used for transmitting power to a ring gear of an engine(not shown). The clutch inner 6 is placed inside the clutch outer 5 to form wedge-like spaces between the outer peripheral surface of the clutch inner 6 and the grooves 5a, and is attached rotatably to the output shaft 1.

Rollers 8 are accommodated in each of the wedge-like spaces so as to be circumferentially movable. Urging springs 9 are further accommodated in each of the wedge-like spaces so as to urge the rollers 8 into narrower portions of the wedge-like spaces. A washer 10 is fixed to the opened end of the clutch outer 5 by a clutch cover 11 so that it can restrict the axial movement of the rollers 8 and can also shield the wedge-like spaces.

A description will now be given of the operation of the conventional over-running clutch with reference to FIG. 6.

The torque of the output shaft 1 is transmitted to the thrust spline 2 via the boss portion 3 which is helically spline-engaged with the output shaft 1, thereby rotating the thrust spline 2. Then, the rollers 8 are wedged between the clutch outer 5 and the clutch inner 6, and the torque of the thrust spline 2 is transmitted to the clutch inner 6 via the rollers 8 so as to allow the pinion 7 to rotate. This further permits the torque of the pinion 7 to be transmitted to the ring gear of the engine.

Simultaneously, each roller 8 revolves into a narrower portion of the wedge-like space within each of the grooves 5a, thereby causing relative distortion between the clutch outer 5 and the clutch inner 6. Accordingly, a load proportional to a transmitted torque is distributed axially on the abutting surfaces of each of the clutch outer 5 and the clutch inner 6 with the rollers 8.

In general, cementation quenching is performed on the thrust spline 2 in order to improve its mechanical strength. However, since the thrust spline 2 is constructed to be opened toward the pinion 7, a thermal treatment performed during cementation quenching causes the thrust spline 2 to be deformed. Due to such thermal deformation of the thrust spline 2 the internal diameter of the clutch outer 5 adjacent to the cam bottom 4 is inclined to be smaller than the internal diameter adjacent to the opened end. This makes the overall clutch outer 5 slightly diverged toward the opened end. In contrast to the clutch outer 5, the clutch inner 6 is constructed such that the external diameter of the clutch inner 6 is formed uniformly along the axis. The clutch outer 5 thus has a disparity between the internal diameter adjacent to the cam bottom 4 and that adjacent to the opened end. Such a clutch outer 5 is combined with the clutch inner 6 having a uniform external diameter. This causes the rollers 8 to be skewed along the axis and fails to ensure uniform distribution of the pressure of the rollers 8 during the transmission of the torque.

An analysis was made according to a finite-element method so as to find a pressure acting on the clutch inner 6 during the transmission of the torque. As indicated by arrows A in FIG. 6, pressure produced at the rear end (adjacent to the cam bottom 4) of the clutch inner 6 is much greater than that produced at the end of the clutch inner 6 adjacent to the pinion 7 (adjacent to the opened end of the clutch outer 5).

Since the conventional over-running clutch is constructed as described above, the rollers 8 are skewed along the axis, thereby failing to ensure uniform distribution of the axial pressure of the rollers 8 during the transmission of the torque. Hence, the conventional over-running clutch presents the following problems. Good torque transmission cannot be achieved. Besides, the clutch inner 6 which is partially subjected to a heavy load are likely to be indented, and the rollers 8 which are also partially subjected to a heavy load are likely to be worn nonuniformly, thus resulting in a decrease in the durability of the over-running clutch.

SUMMARY OF THE INVENTION

Accordingly, in order to overcome the above drawbacks, an object of the present invention is to provide an over-running clutch which corrects nonuniform load distribution caused by the axial skewing of rollers due to the configuration of a clutch outer which is slightly diverged toward the opened end, thereby obtaining good characteristics of torque transmission and improving durability.

In order to achieve the above object, according to the present invention, there is provided an over-running clutch comprising: a tube-like clutch outer being at one end opened and at the other end formed integrally with a cylindrical portion having a small internal diameter, and having a plurality of grooves which are formed circumferentially around the inner peripheral surface each having a wegde-like shape so that each gradually decreases around the circumference in a single direction; a clutch inner placed inside the clutch outer so as to form wedge-like spaces between the outer peripheral surface of the clutch inner and the grooves, and having an axial tilting in such a way that the external diameter of the clutch inner decreases in the direction from the opened end of the clutch outer to the cylindrical portion; rollers accommodated in each of the wedge-like spaces so as to be circumferentially movable; and urging springs accommodated in each of the wedge-like spaces so as to constantly urge the rollers into narrower portions of the wedge-like spaces, wherein the over-running clutch transmits a driving force in a single direction from the clutch outer to the clutch inner via the rollers.

DESCRIPTION OF THE PREFERRED EMBODIMENTS

Embodiments of the present invention will now be described with reference to the drawings.

First Embodiment

Figure 1:
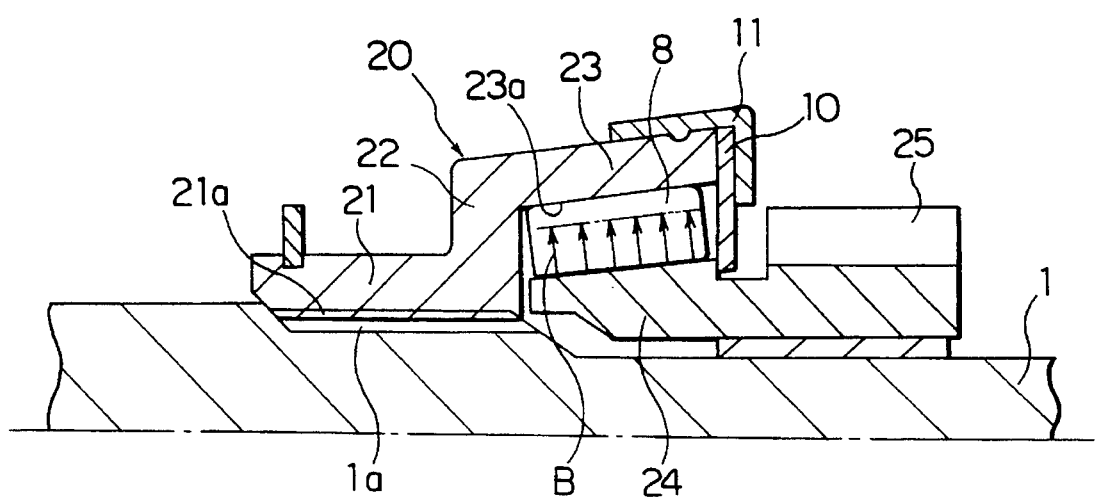
FIG. 1 is a sectional view of an over-running clutch according to a first embodiment of the present invention.
Figure 4:
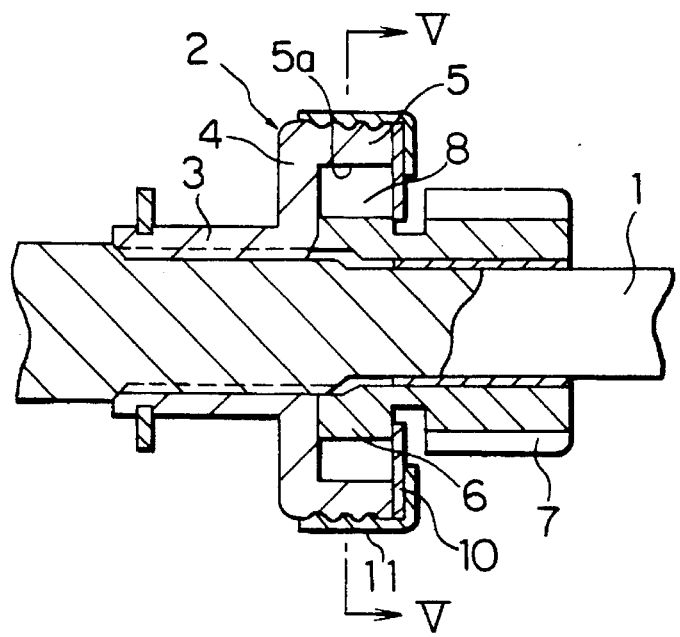
FIG. 4 is a sectional view of a conventional over-running clutch.
Figure 5:
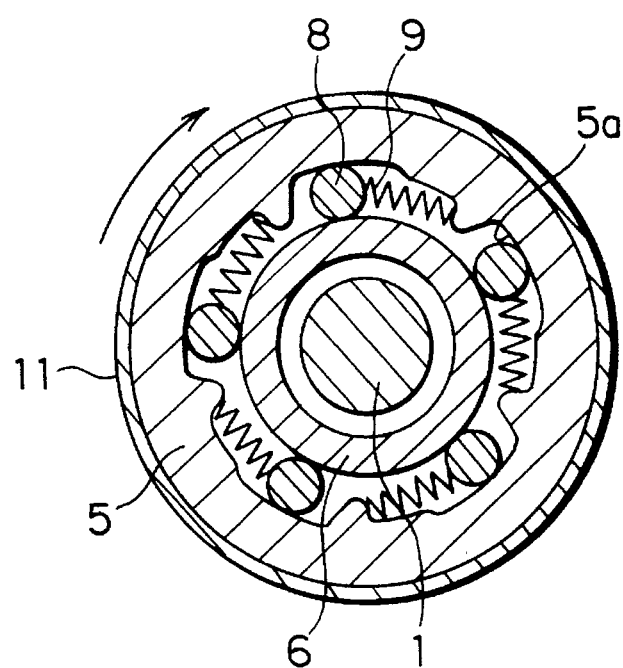
FIG. 5 is a sectional view along line V—V of FIG. 4.
Figure 6:
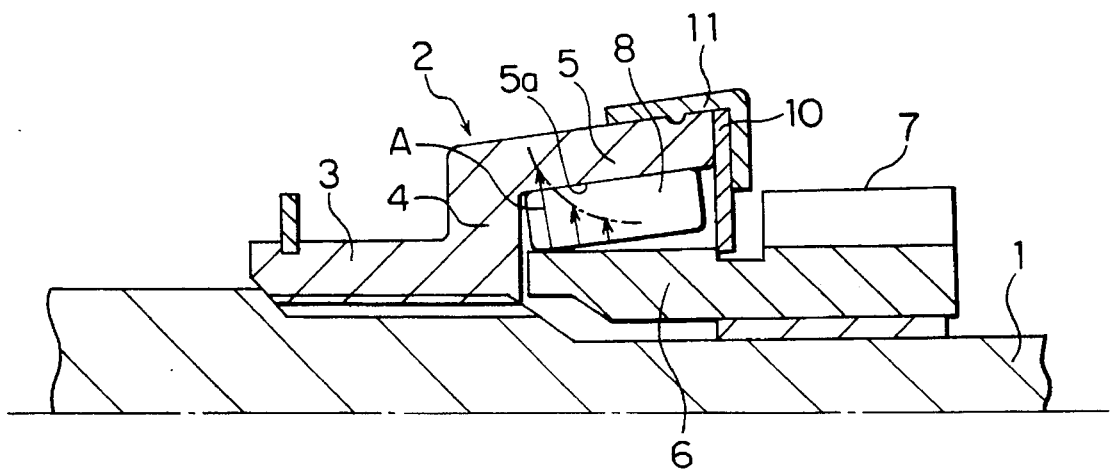
FIG. 6 is a sectional view illustrative of the operation of a conventional over-running clutch.

FIG. 1 is a sectional view illustrative of an over-running clutch according to a first embodiment of the present invention. The same and corresponding components as those shown in FIGS. 4–6 are designated by like reference numerals, and an explanation thereof will thus be omitted.

Referring to FIG. 1, a thrust spline generally denoted by 20 comprises: a boss portion 21 having a helical spline 21a formed on the inner peripheral surface; a cam bottom 22 formed in a cylindrical shape; and a tube-like clutch outer 23, such components being formed integrally with each other. The internal diameter of the cam bottom 22 is adapted to be formed smaller than that of the clutch outer 23. The thrust spline 20 is constructed to be opened toward a pinion in such a way that the clutch outer 23 is at one end opened and is at the other end closed by the cam bottom 22. As well as the foregoing clutch outer 5, the clutch outer 23 of this embodiment has five grooves 23a which are formed circumferentially around the inner peripheral surface of the clutch outer 23 at an equal pitch each having a wedge-like shape so that each gradually decreases around the circumference in a single direction and having a uniform internal diameter along the axis. The thrust spline 20 is attached to an output shaft 1 by the engagement of the helical spline 21a formed on the inner peripheral surface of the boss portion 21 with a helical spline 1a mounted on the output shaft 1 which is rotated by a starter motor (not shown).

A clutch inner 24 is formed into a cylindrical shape and is formed integrally with a pinion 25 for transmitting power to a ring gear of an engine (not shown). The clutch inner 24 is placed inside the clutch outer 23 so as to form wedge-like spaces between the outer peripheral surface of the clutch inner 24 and the grooves 23a. The clutch inner 24 is attached rotatably to the output shaft 1.

Rollers 8 are accommodated in each of the wedge-like spaces formed between the clutch outer 23 and the clutch inner 24 so as to be circumferentially movable. Urging springs 9 are also accommodated in each of the wedge-like spaces so as to urge the rollers 8 into narrower portions of the wedge-like spaces. The washer 10 is fixed to the opened end of the clutch outer 23 by the clutch cover 11 so that it can restrict the axial movement of the rollers 8 and can also shield the wedge-like spaces.

Cementation quenching is performed on the clutch outer 23 in order to improve its mechanical strength. Thus, the internal diameter of the clutch outer 23, that is, the internal diameter of the grooves 23a, gradually decreases generally in a linear form in the direction from the opened end to the cam bottom 22, which disparity between the internal diameter adjacent to the opened end and the internal diameter adjacent to the cam bottom 22 is 0.1 mm. In order to match the configuration of the clutch outer 23 as described above, the outer peripheral surface of the clutch inner 24 is tapered such that the external diameter decreases generally in a linear form in the direction from the forward end adjacent to the pinion 25 to the rear end. The external diameter of the rear end is 0.1 mm smaller than that of the forward end adjacent to the pinion 25, and the outer peripheral surface of the clutch inner 24 has a tilting angle of 0.1°.

An explanation will now be given of the operation of the over-running clutch constructed as described above in the first embodiment.

A starter motor (not shown) is actuated to rotate the output shaft 1. The torque of the output shaft 1 is transmitted to the clutch outer 23 integrally formed with the boss portion 21 via the helical splines 1a and 21a. The clutch outer 23 is rotated so as to allow the rollers 8 accommodated in each of the wedge-like spaces formed between the grooves 23a of the clutch outer 23 and the clutch inner 24 to revolve into narrower portions of the wedge-like spaces, thereby allowing the rollers 8 to be engaged with the clutch inner 24. The torque is further transmitted via the rollers 8 to the pinion 25 integrally formed with the clutch inner 24, thereby driving the ring gear of the engine and accordingly starting the engine.

After starting the engine, the pinion 25 is rotated interlocked with the ring gear. Simultaneously, the rollers 8 are freed from the engagements with the clutch outer 23 and also with the clutch inner 24, thereby isolating the over-running torque from the engine.

The outer peripheral surface of the clutch inner 24 is constructed to be tapered so as to match the configuration of the clutch outer 23 which is slightly diverged toward the opened end. That is, the axial tilting of the grooves 23a formed circumferentially around the inner peripheral surface of the clutch outer 23 matches the axial tilting of the outer peripheral surface of the clutch inner 24. This prevents the rollers 8 from being skewed along the axis during the transmission of the torque, thereby ensuring uniform distribution of the axial pressure of the rollers 8. In order to prove this uniform pressure distribution, an analysis was made according to the finite element method so as to find the pressure acting on the clutch inner 24 during the transmission of the torque. As indicated by arrows B in FIG. 1, it is seen that uniform pressure distribution is obtained along the axis of the clutch inner 24.

In comparison between the over-running clutch of the first embodiment and the conventional over-running clutch shown in FIG. 4, a constraining test was repeatedly performed on both clutches as follows. A starter motor was attached to each of the over-running clutches, and a constrained ring gear was meshed with a pinion according to a test pattern of a combination of driving for 0.5 s and pausing for 59.5 s. Then, measurements were made on the number of tests required to reach the state of the clutch idling at which the torque cannot be transmitted due to wear of the rollers and wear of the outer peripheral surface of the clutch inner. In consequence, the test numbers required to reach the idling state of the over-running clutch of this embodiment was two times more than that of the conventional over-running clutch. It was thus validated that there is a significant improvement in durability of the over-running clutch of this embodiment over the conventional over-running clutch.

As described above, according to the first embodiment, the outer peripheral surface of the clutch inner 24 is formed to be tapered compatible with the configuration of the clutch outer 23 which is slightly diverged toward the opened end. In other words, the axial tilting of the grooves 23a formed circumferentially around the inner peripheral surface of the clutch outer 23 is allowed to match the axial tilting of the outer peripheral surface of the clutch inner 24. Hence, the over-running clutch of the first embodiment ensures uniform axial distribution of a load subjected to the clutch inner 24 during the transmission of the torque. This enables an improvement in characteristics of the torque transmission and also avoids indentations on the clutch inner 24 and prevents nonuniform wear of the rollers 8 due to the nonuniform load distribution, thereby improving durability.

In the first embodiment the outer peripheral surface of the clutch inner 24 is formed to be tapered in such a way that the disparity in the external diameter between one end adjacent to the opened end of the clutch outer 23 and the other end adjacent to the cam bottom 22 is 0.1 mm and that the tilting angle is 0.1°. However, this is merely an illustration. The shape of the outer peripheral surface of the clutch inner 24 may be adaptable according to a variation in the axial skewing of the inner peripheral surface of the clutch outer 23 which skewing is determined by the entire configuration of the thrust spline 20.

Second Embodiment

Figure 2:
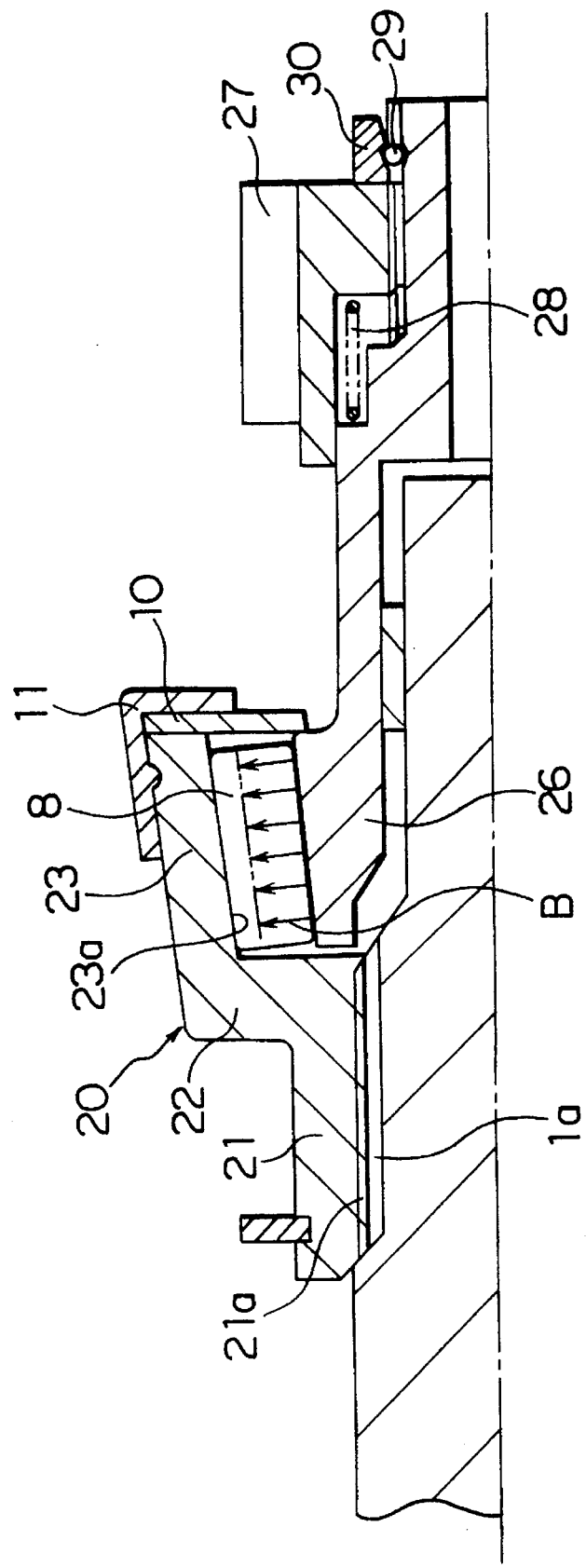
FIG. 2 is a sectional view of an over-running clutch according to a second embodiment of the present invention.

FIG. 2 is a sectional view of an over-running clutch according to a second embodiment of the present invention. Referring to FIG. 2, a clutch inner 26 is formed into a cylindrical shape and is placed at one end inside an clutch outer 23 so as to form wedge-like spaces between the outer peripheral surface of the clutch inner 26 and the grooves 23a formed circumferentially around the inner peripheral surface of the clutch outer 23. The clutch inner 26 is attached rotatably to the output shaft 1. A pinion 27 is spline-engaged with the outer peripheral surface of the other end of the clutch inner 26. The pinion 27 is prevented from coming out of the clutch inner 26 by a ring 29 and a stopper 30 both of which are attached to the clutch inner 26. A pinion urging spring 28 is further provided in a contracting form between the clutch inner 26 and the pinion 27. The outer peripheral surface of the clutch inner 26 is formed to be tapered in such a way that the external diameter decreases generally in a linear form in the direction from the opened end of the clutch outer 23 to the other end adjacent to the cam bottom 22. The external diameter of the end adjacent to the cam bottom 22 is 0.1 mm smaller than the other end adjacent to the opened end of the clutch outer 23, and the tilting angle is 0.1°. The constructions other than that described above are similar to those in the first embodiment.

The operation characterized by the second embodiment will now be explained.

The pinion urging spring 28 provided in a contracting form between the clutch inner 26 and the pinion 27 urges the pinion 27, which is thus pressed against the end of the clutch inner 26 adjacent to the pinion 27 so as to abut against the stopper 30. Accordingly, the torque of the output shaft 1 is transmitted to the thrust spline 20 which is spline-engaged with the output shaft 1 and is further transmitted to the clutch inner 26 via the clutch outer 23 and the rollers 8. Subsequently, the torque is transmitted from the clutch inner 26 to the pinion 27 which is spline-engaged with the clutch inner 26, thereby driving the ring gear of the engine.

In the second embodiment the axial tilting of the outer peripheral surface of the clutch inner 26 is allowed to be substantially equal to that of the inner peripheral surface of the grooves 23a formed circumferentially around the inner peripheral surfase of the clutch outer 23. Consequently, advantages similar to those obtained by the over-running clutch in the first embodiment can also be expected.

Third Embodiment

Figure 3:
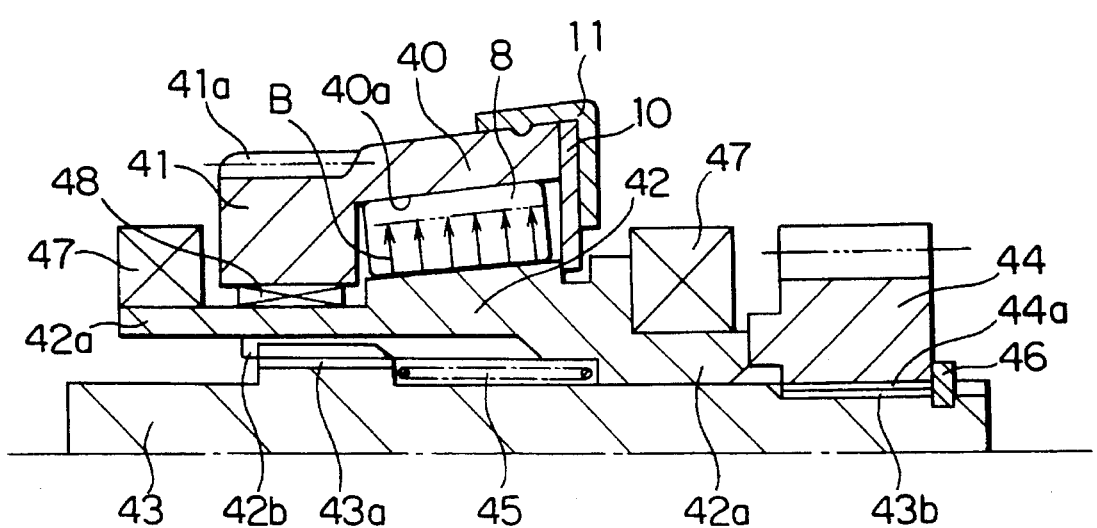
FIG. 3 is a sectional view of an over-running clutch according to a third embodiment of the present invention.

FIG. 3 is a sectional view of an over-running clutch according to a third embodiment: of the present invention. Referring to FIG. 3, a tube-like clutch outer 40 is constructed to be at one end opened and at the other end closed by a cylindrical cam bottom 41 with a small internal diameter which is formed integrally with the clutch outer 40. As well as the foregoing clutch outer 5, the clutch outer 40 of this embodiment has five grooves 40a which are formed circumferentially around the inner peripheral surface of the clutch outer 40 at an equal pitch each having a wedge-like shape so that each gradually decreases around the circumference in a single direction and having a uniform internal diameter along the axis. A tooth portion 41a is arranged around the outer peripheral surface of the cam bottom 41 so as to receive the torque transmitted from a starter motor (not shown), or the like.

The clutch inner 42 is formed into a cylindrical shape, and flanges 42a each arranged at either end of the clutch inner 42 are supported rotatably by respective bearings 47. The clutch inner 42 is attached to an output shaft 43 by the engagement of a helical spline 42b with a helical spline 43a formed around the output shaft 43. A pinion 44 for transmitting power to a ring gear of an engine (not shown) is attached to the output shaft 43 by the engagement of a helical spline 44b with the helical spline 43a formed around the output shaft 43. A snap ring 46 is fit to the output shaft 43 for preventing the pinion 44 from being pulling out forward. A spring 45 is provided in a contracting form between the clutch inner 42 and the output shaft 43 so as to urge the output shaft 43 rearward.

The cam bottom 41 is attached rotatably to the flange 42a of the clutch inner 42 via the bearing 47. In such a state, wedge-like spaces has been formed between grooves 40a formed circumferentially around the inner peripheral surface of the clutch outer 40 and the outer peripheral surface of the clutch inner 42. Rollers 8 are accommodated in each of the wedge-like spaces formed between the clutch outer 40 and the clutch inner 42 so as to be circumferentially movable. Urging springs 9 are further accommodated in each oil the wedge-like spaces so as to urge the rollers 8 into narrower portions of the wedge-like spaces. The washer 10 is fixed to the opened end of the clutch outer 40 by the clutch cover 11 so that it can restrict the axial movement of the rollers 8 and can also shield the wedge-like spaces.

Cementation quenching is performed on the clutch outer 40 in order to improve its mechanical strength. Thus, the internal diameter of the clutch outer 40, that is, the internal diameter of the grooves 40a, gradually decreases generally in a linear form in the direction from the opened end to the cam bottom 41, which disparity between the internal diameter adjacent to the opened end and the internal diameter adjacent to the cam bottom 41 is 0.1 mm. In order to compatible with the configuration of the clutch outer 40 as described above, the outer peripheral surface of the clutch inner 42 is tapered such that the external diameter decreases generally in a linear form in the direction from the forward end adjacent to the opened end of the clutch outer 40 to the rear end adjacent to the cam bottom 41. The external diameter of the rear end is 0.1 mm smaller than that of the forward end of the clutch inner 42, and a tilting angle is 0.1°.

A description will now be given of the operation of the over-running clutch according to the third embodiment.

The output shaft 43 is first allowed to move forward against an urging force of the spring 45 by movement means for moving the output shaft forward (not shown), thereby allowing the pinion 44 to mesh with the ring gear.

Then, a starter motor (not shown) is actuated to rotate the cam bottom 41 and also the clutch outer 40 formed integrally with the cam bottom 41. This further permits the rollers 8 accommodated in each of the wedge-like spaces formed between the grooves 40a of the clutch outer 40 and the clutch inner 42 to revolve into narrower portions of the wedge-like spaces, thereby achieving an engagement between the rollers 8 and the clutch inner 42. The torque is transmitted to the clutch inner 42 via the rollers 8 and is further transmitted to the output shaft 43 via the helical splines 42b and 43a. The torque is finally transmitted to the pinion 44 via the helical splines 43b and 44a, thereby driving the ring gear of the engine and accordingly starting the engine.

After starting the engine, the pinion 44 is rotated interlocked with the ring gear, thereby rotating the output shaft 43 and the clutch inner 42. Simultaneously, the rollers 8 are freed from the engagements with the clutch outer 40 and also with the clutch inner 42, thereby isolating the over-running torque from the engine.

When the output shaft 43 is released from an urging force of the movement means for moving the output shaft forward, it moves rearward by an urging force of the spring 45. This releases the meshing state between the pinion 44 and the ring gear, thereby returning the over-running clutch to the original state shown in FIG. 3.

The outer peripheral surface of the clutch inner 42 is constructed to be tapered so as to match the configuration of the clutch outer 40 which is slightly diverged toward the opened end. That is, the axial tilting of the grooves 40a formed circumferentially around the inner peripheral surface of the clutch outer 40 is allowed to match the axial tilting of the outer peripheral surface of the clutch inner 42. This prevents the rollers 8 from being skewed along the axis during the transmission of the torque, thereby ensuring uniform distribution of the axial pressure of the rollers 8. In order to prove this uniform pressure distribution, an analysis was made according to a finite element method so as to find pressure acting on the clutch inner 42 during the transmission of the torque. As indicated by arrows B in FIG. 3, it is seen that uniform pressure distribution is obtained along the axis of the clutch inner 42.

In the third embodiment advantages similar to those obtained by the over-running clutch of the first embodiment can also be expected.

What is claimed is:

1. An over-running clutch, comprising:

a) a tube-like clutch outer open at one end and formed integrally with a cylindrical portion having a small internal diameter at the other end, and having a plurality of grooves formed circumferentially around an inner peripheral surface, each groove having a wedge-like shape gradually decreasing around the circumference in a single direction, wherein an internal diameter of said grooves decreases linearly from said open end to said other end due to cementation quenching such that said clutch outer exhibits a permanent divergence toward said open end at a small, acute tilt angle relative to an axis of the clutch;

b) a clutch inner disposed inside said clutch outer so as to form wedge-like spaces between an outer peripheral surface of said clutch inner and said grooves, and having a permanent axial tilt angle such that an external diameter of said clutch inner decreases in a direction from the open end of said clutch outer to said cylindrical portion, wherein the tilt angles of the clutch inner and the clutch outer are substantially equal;

c) a plurality of rollers individually accommodated in said wedge-like spaces so as to be circumferentially movable; and d) a plurality of biasing springs individually accommodated in said wedge-like spaces so as to constantly urge said rollers into narrower portions of said wedge-like spaces, wherein said over-running clutch transmits a driving force in a single direction from said clutch outer to said clutch inner via said rollers.

* * * * *